(12) United States Patent
Lai

(10) Patent No.: US 12,608,134 B2
(45) Date of Patent: Apr. 21, 2026

(54) MEMORY SCHEDULING DEVICE AND MEMORY SCHEDULING METHOD

(71) Applicant: REALTEK SEMICONDUCTOR CORPORATION, Hsinchu (TW)

(72) Inventor: Chi-Shao Lai, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 18/974,405

(22) Filed: Dec. 9, 2024

(65) Prior Publication Data

US 2025/0238140 A1 Jul. 24, 2025

(30) Foreign Application Priority Data

Jan. 23, 2024 (TW) ................................. 113102516

(51) Int. Cl.
G06F 3/06 (2006.01)

(52) U.S. Cl.
CPC .......... G06F 3/0613 (2013.01); G06F 3/0659 (2013.01); G06F 3/0673 (2013.01)

(58) Field of Classification Search
CPC .... G06F 3/0613; G06F 3/0659; G06F 3/0673; G06F 13/14; G06F 13/1605; G06F 13/364; G06F 2213/26; G05B 2219/15099; H04L 2021/5679; H04L 47/78; H04L 12/40084; H04Q 2011/005
See application file for complete search history.

(56) References Cited

U.S. PATENT DOCUMENTS

| | | | |
|---|---|---|---|
| 6,519,666 B1 * | 2/2003 | Azevedo ............... | G06F 13/362 |
| | | | 710/309 |
| 7,107,365 B1 * | 9/2006 | Clark .................... | G06F 13/364 |
| | | | 710/110 |
| 8,239,590 B1 * | 8/2012 | Wennekamp ...... | H03K 19/1774 |
| | | | 710/305 |
| 2011/0314197 A1 * | 12/2011 | Hashimoto ........... | G06F 1/3237 |
| | | | 710/110 |

(Continued)

OTHER PUBLICATIONS

Jang et al. "An SDRAM-Aware Router for Networks-on-Chip", Oct. 2010, IEEE.

(Continued)

*Primary Examiner* — Khoa D Doan
(74) *Attorney, Agent, or Firm* — WPAT, PC

(57) ABSTRACT
A memory scheduling device includes a pre-processing storage, a selector, a current storage, and an arbiter. The pre-processing storage provides a plurality of main commands and a plurality of secondary commands. The selector selects the main commands and/or the secondary commands based on a selection signal. The current storage receives the main commands and/or the secondary commands transmitted from the selector. The arbiter precomputes a predict burst length corresponding to the main commands expected to be received by the current storage based on a round-robin sequence. If the predict burst length corresponding to the main commands is less than a threshold burst length, the arbiter transmits the selection signal to the selector, such that the pre-processing storage transmits a portion of main commands and at least one secondary command of the secondary commands to the current storage through the selector.

20 Claims, 8 Drawing Sheets

(56) References Cited

U.S. PATENT DOCUMENTS

2022/0317928 A1* 10/2022 Shen ................... G06F 13/1626

OTHER PUBLICATIONS

Wei et al. "Memory Access Optimization of a Neural Network Accelerator Based on Memory Controller", Electronics 2021, MDPI.
Onur Mutlu, "Computer Architecture Lecture 22 Memory Controllers", Mar. 25, 2015, Carnegie Mellon University.
Jedec Solid State Technology Association, "Low Power Double Data Rate 5 (LPDDR5), JESD209-5", Feb. 2019, Jedec Standard.
Jedec Solid State Technology Association, "DDR5 SDRAM, JESD79-5", Jul. 2020, Jedec Standard.
Jedec Solid State Technology Association, "Low Power Double Data Rate 4 (LPDDR4), JESD209-4", Aug. 2014, Jedec Standard.
Jedec Solid State Technology Association, "DDR4 SDRAM, JESD79-4", Sep. 2012, Jedec Standard.

* cited by examiner

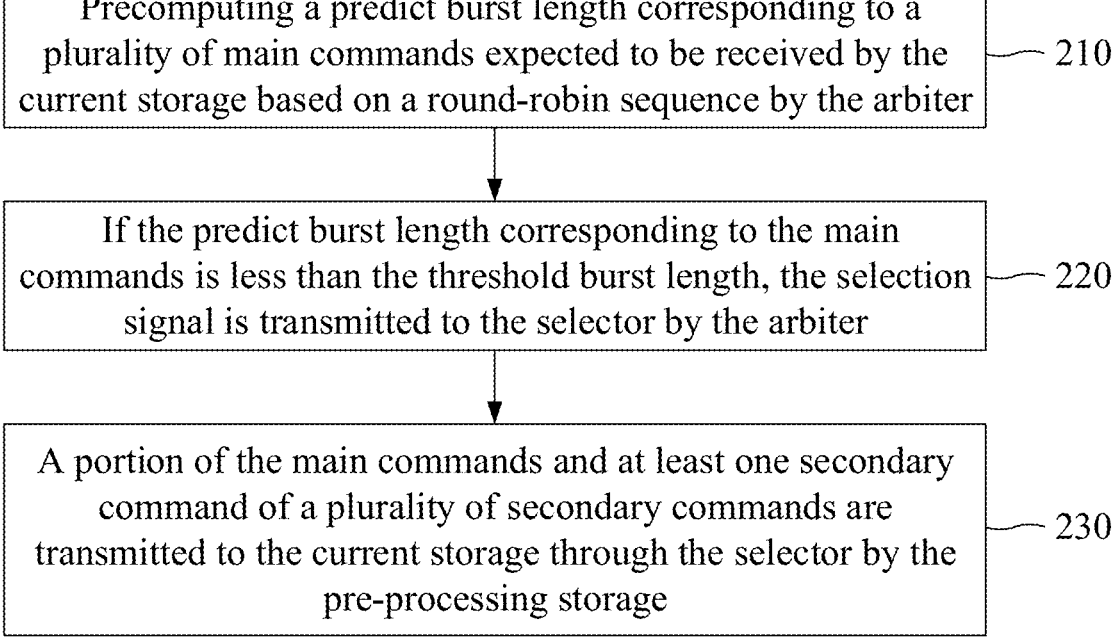

Precomputing a predict burst length corresponding to a plurality of main commands expected to be received by the current storage based on a round-robin sequence by the arbiter — 210

If the predict burst length corresponding to the main commands is less than the threshold burst length, the selection signal is transmitted to the selector by the arbiter — 220

A portion of the main commands and at least one secondary command of a plurality of secondary commands are transmitted to the current storage through the selector by the pre-processing storage — 230

Total burst length $\geq$ Threshold burst length

Fig. 3

MEMORY SCHEDULING DEVICE AND MEMORY SCHEDULING METHOD

BACKGROUND OF THE INVENTION

1. Field of the Invention

The present disclosure relates to a memory scheduling device and a memory scheduling method, especially to a memory scheduling device and a memory scheduling method that determines whether to transmit main commands and/or secondary commands based on a predict burst length.

2. Description of Related Art

In dynamic random-access memory (DRAM), Four Active Window (tFAW) is a timing parameter of DRAM, which represents the window period for accessing four memory banks. Due to the regulations of tFAW, the efficiency of DRAM may be affected.

SUMMARY OF THE INVENTION

In some aspects, an object of the present disclosure is to, but not limited to, provides a memory scheduling device and a memory scheduling method that makes an improvement to the prior art.

An embodiment of a memory scheduling device of the present disclosure includes a pre-processing storage, a selector, a current storage, and an arbiter. The pre-processing storage provides a plurality of main commands and a plurality of secondary commands. The selector selects the main commands and/or the secondary commands based on a selection signal. The current storage receives the main commands and/or the secondary commands transmitted from the selector. The arbiter precomputes a predict burst length corresponding to the main commands expected to be received by the current storage based on a round-robin sequence. If the predict burst length corresponding to the main commands is less than a threshold burst length, the arbiter transmits the selection signal to the selector, such that the pre-processing storage transmits a portion of the main commands and at least one secondary command of the secondary commands to the current storage through the selector.

An embodiment of a memory scheduling method of the present disclosure includes: precomputing a predict burst length corresponding to a plurality of main commands expected to be received by a current storage based on a round-robin sequence by an arbiter; if the predict burst length corresponding to the main commands is less than a threshold burst length, transmitting a selection signal to a selector by the arbiter; and transmitting a portion of the main commands and at least one secondary command of a plurality of secondary commands to the current storage through the selector by a pre-processing storage.

Technical features of some embodiments of the present disclosure make an improvement to the prior art. The memory scheduling device and the memory scheduling method of the present disclosure can pre-determine which main commands are received by the current storage based on the round-robin sequence and calculate the predicted burst length corresponding to the above-mentioned main commands. If the predicted burst length is less than the threshold burst length, the access condition of dynamic random-access memory (DRAM) will be affected due to Four Active Window (tFAW) constraint. At this time, the present disclosure may transmit the selection signal to the selector, such that the pre-processing storage transmits the secondary commands through the selector for replacing one of the main commands which is intended to be transmitted. In view of the above, the predicted burst length corresponding to all commands (including the main and secondary commands) is larger than or equal to the threshold burst length, thereby avoiding a decline in memory utilization.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 2 shows an embodiment of a flow diagram of a memory scheduling method of the present disclosure.

FIG. 3 shows an embodiment of an operation diagram of a memory scheduling device of the present disclosure.

DETAILED DESCRIPTION OF THE PREFERRED EMBODIMENTS

In order to improve the issue that the efficiency of dynamic random-access memory (DRAM) may be affected due to Four Active Window (tFAW) constraint, the present disclosure provides a memory scheduling device and a memory scheduling method, which will be explained in detail as shown below.

Figure 1:
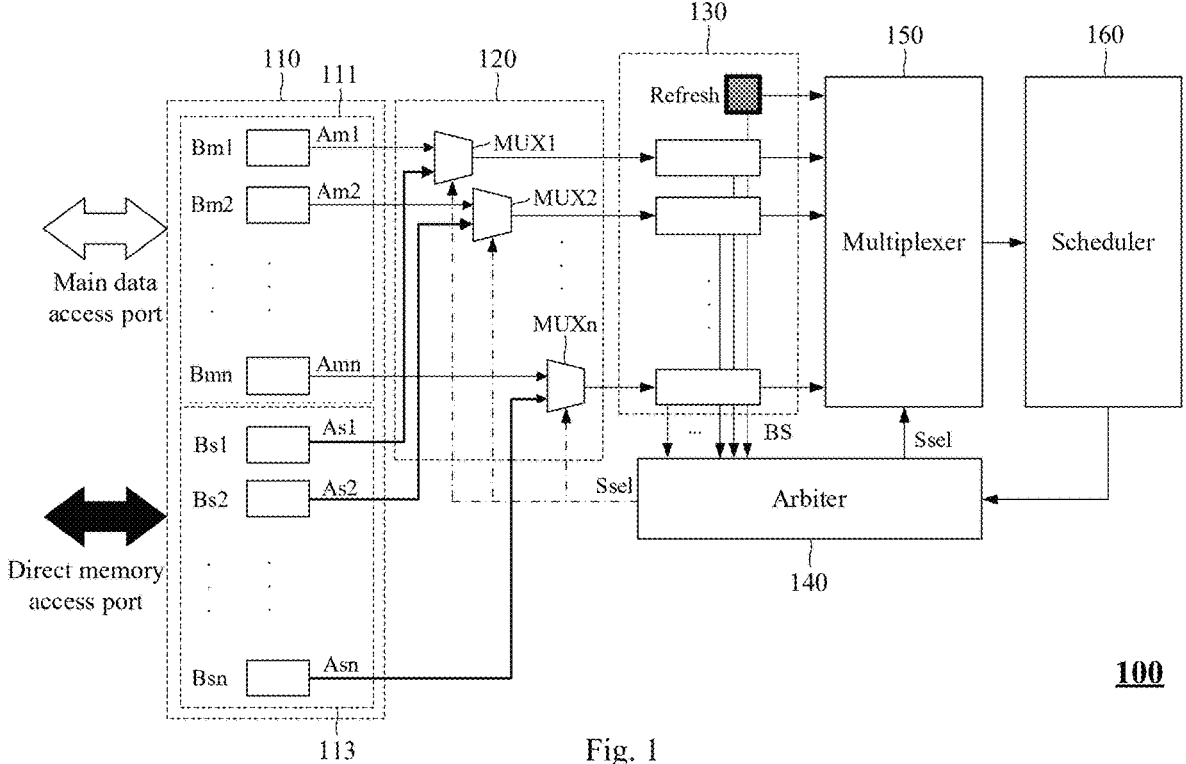
FIG. 1 shows an embodiment of a memory scheduling device of the present disclosure.

FIG. 1 shows an embodiment of a memory scheduling device 100 of the present disclosure. As shown in the figure, the memory scheduling device 100 includes a pre-processing storage 110, a selector 120, a current storage 130, an arbiter 140, a multiplexer 150, and a scheduler 160.

In some embodiments, the selector 120 is coupled to the pre-processing storage 110. The current storage 130 is coupled to the selector 120, the arbiter 140, and the multiplexer 150. The multiplexer 150 is coupled to the arbiter 140 and the scheduler 160. The pre-processing storage 110 is configured to provide a plurality of main commands Am1~Amn and a plurality of secondary commands As1~Asn. The selector 120 is configured to select the main commands Am1~Amn and/or the secondary commands As1~Asn based on a selection signal Ssel. The current storage 130 is configured to receive the main commands Am1~Amn and/or the secondary commands As1~Asn transmitted from the selector 120. The multiplexer 150 transmits the main commands Am1~Amn and/or the secondary commands As1~Asn received by the current storage 130 to the scheduler 160 based on the selection signal Ssel for execution by the scheduler 160.

For facilitating the understanding of operations of the memory scheduling device 100 of the present disclosure, reference is now made to FIG. 2. FIG. 2 shows an embodiment of a flow diagram of a memory scheduling method 200 of the present disclosure. In step 210, precomputing a predict burst length corresponding to a plurality of main commands Am1~Am4 expected to be received by the current storage 130 based on a round-robin sequence by the arbiter 140. For example, the arbiter 140 can pre-determine the plurality of main commands Am1~Am4 expected to be received by the current storage 130 from the pre-processing storage 110 based on the round-robin sequence. Therefore, the arbiter 140 can precompute the predict burst length (burst size) corresponding to the main commands Am1~Am4 expected to be received by the current storage 130.

Figure 3:
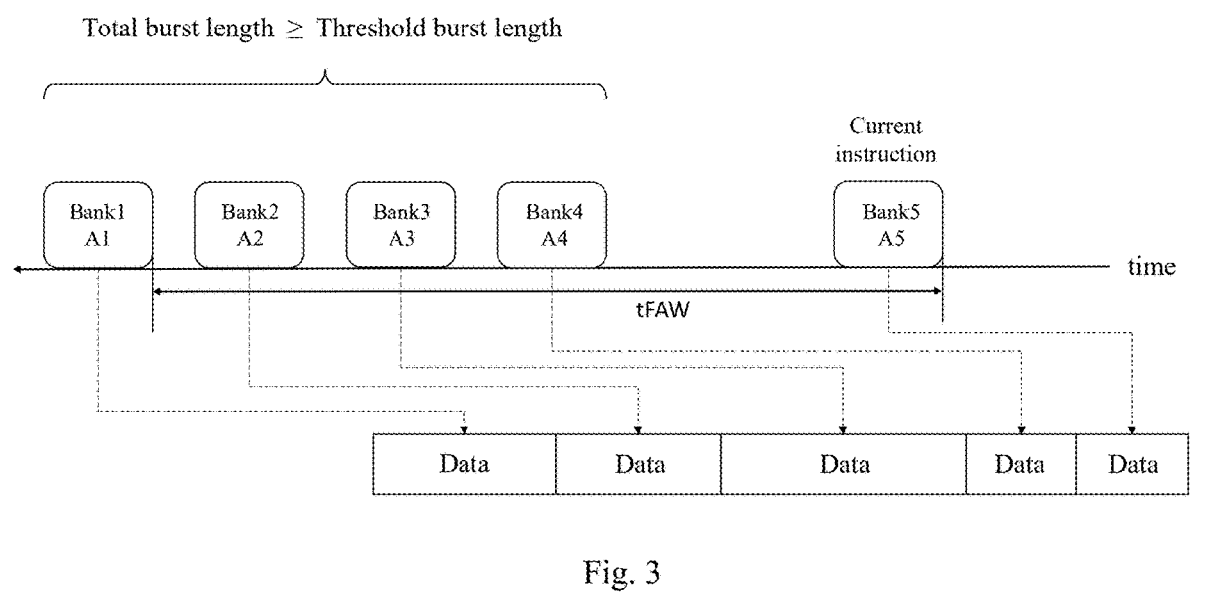

The operations of the memory scheduling device 100 are explained in conjunction with FIG. 3 to FIG. 7 as shown below. FIG. 3 to FIG. 7 show embodiments of operation diagrams of the memory scheduling device 100 of the present disclosure. As shown in FIG. 3, this is a schematic diagram of Four Active Window (tFAW) executed by the current storage 130. There is a tFAW window among instructions A1~A5, which corresponds to a total burst length. In this embodiment, the total burst length is larger than or equal to a threshold burst length. Therefore, despite the delay in subsequent instruction A5 (data corresponding to instruction A5 also delays), due to a significant amount of data accessing DRAM needing to be processed, the high utilization of the DRAM Data Bus can persist until accessing the data corresponding to instruction A5. The calculation formula for the threshold burst length is as follows:

$$BS_{th} = RU\left(\frac{tFAW}{tCK}\right) \times 2 \times 4 \left(\frac{DQ}{8}\right) \qquad \text{formula 1}$$

As shown in formula 1, $BS_{th}$ is the threshold burst length, tFAW is the tFAW window. Besides, the calculation formula for the block size of the dynamic random-access memory (DRAM) is as follows:

$$B_{size} = BL \times \left(\frac{DQ}{8}\right) \qquad \text{formula 2}$$

As shown in formula 2, $B_{size}$ is the block size, BL is the burst length. For example, assume that the CKR(WCK:CK) of the low power dynamic random-access memory LPDDR5-6400 is 4:1, DQ is 16 bit, tFAW is 20 ns, and the above-mentioned parameters are substituted into formula 1 and formula 2, the results are as follows:

$$BS_{th} = RU\left(\frac{20}{1.25}\right) \times 2 \times 4 \times \left(\frac{16}{8}\right) = 256(B)$$

$$B_{size} = 16 \times \left(\frac{16}{8}\right) = 32(B)$$

In another embodiment, assume that the CKR of the low power dynamic random-access memory LPDDR5-6400 is 4:1, DQ is 32, tFAW is 20, and the above-mentioned parameters are substituted into formula 1 and formula 2, the results are as follows:

$$BS_{th} = RU\left(\frac{20}{1.25}\right) \times 2 \times 4 \times \left(\frac{32}{8}\right) = 512(B)$$

-continued
$$B_{size} = 16 \times \left(\frac{32}{8}\right) = 64(B)$$

Figure 4:
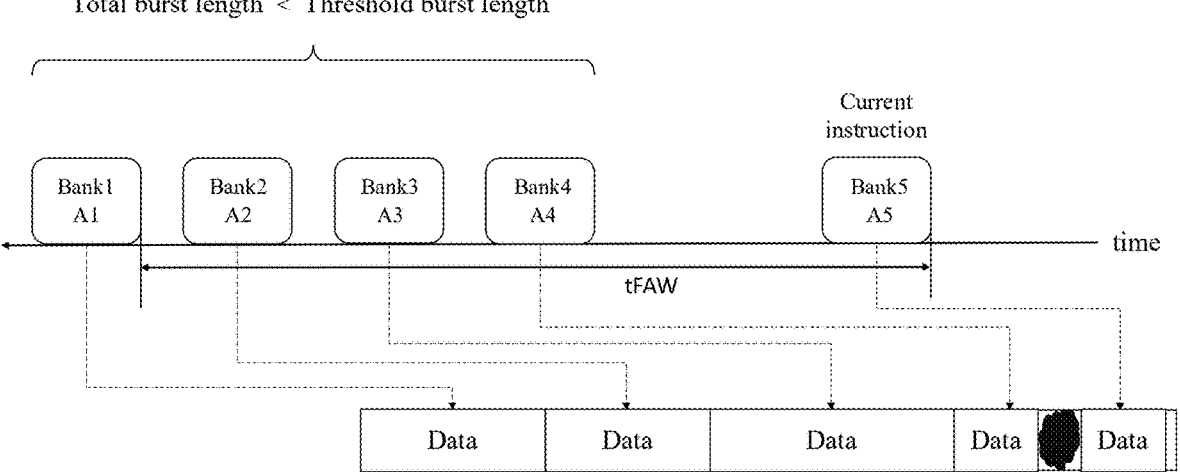
FIG. 4 shows an embodiment of an operation diagram of a memory scheduling device of the present disclosure.
Figure 5:
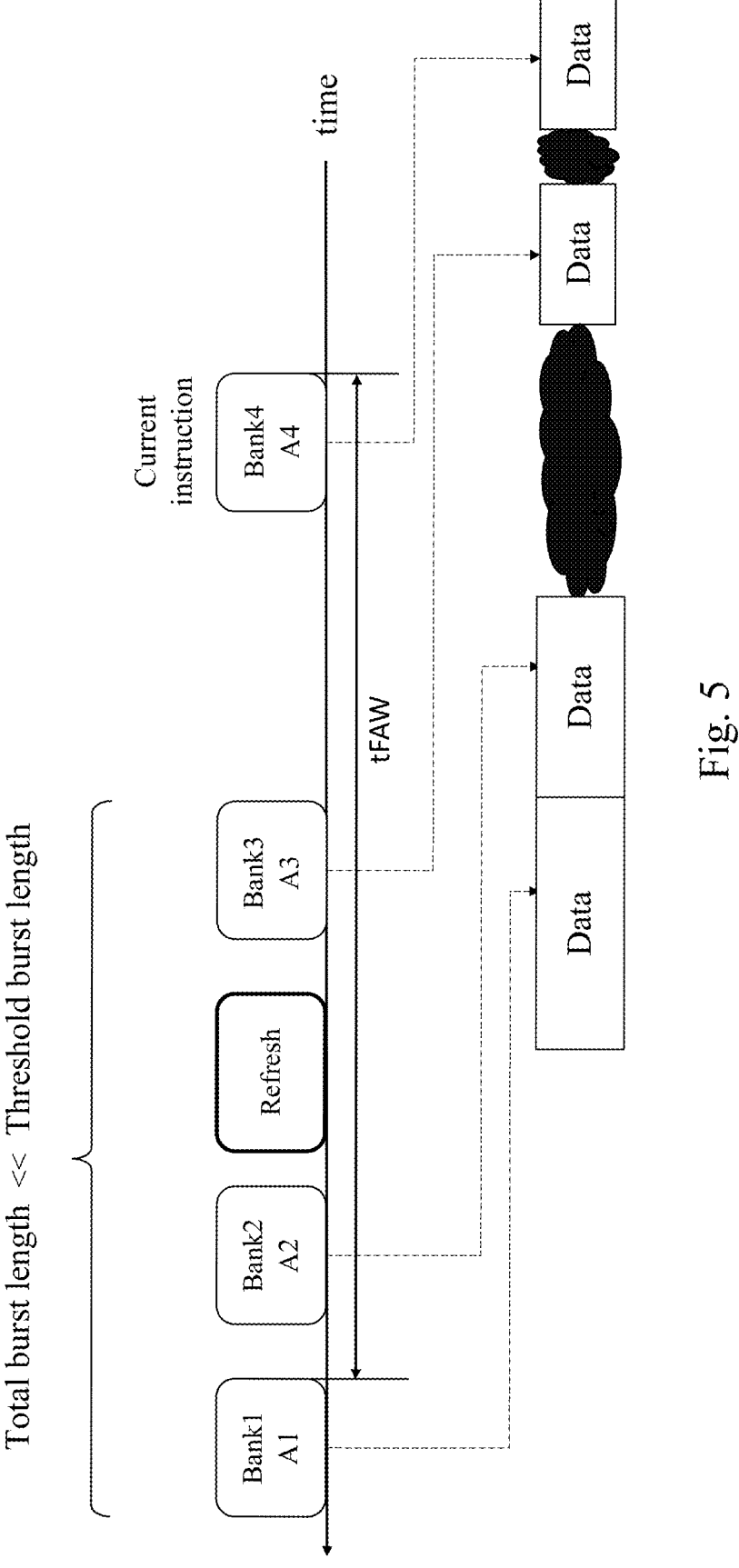
FIG. 5 shows an embodiment of an operation diagram of a memory scheduling device of the present disclosure.

Reference is now made to FIG. 4, the total burst length is less than the threshold burst length. Therefore, subsequent instruction A5 will delay, and the data corresponding to instruction A5 also delays, resulting in discontinuity in the data. FIG. 5 illustrates a refresh occurring within the tFAW window. As shown in the figure, the refresh will lead to more severe discontinuities in the data.

In order to improve the discontinuity issue caused by delayed instructions, the arbiter 140 of the present disclosure can pre-determine the main commands Am1~Am4 expected to be received by the current storage 130 from the pre-processing storage 110 based on the round-robin sequence, and can precompute the predict burst length corresponding to the main commands Am1~Am4. Subsequently, the disclosure can make adjustment to avoid instruction delay based on the predicted burst length, which will be explained in detail as shown below.

Reference is now made back to FIG. 1 and FIG. 2, in step 220, if the predict burst length corresponding to the main commands Am1~Am4 is less than the threshold burst length, the selection signal Ssel is transmitted to the selector 120 by the arbiter 140. In step 230, a portion (e.g., the main commands Am2~Am4) of the main commands Am1~Am4 and at least one secondary command (e.g., the secondary command As1) of a plurality of secondary commands As1~Asn are transmitted to the current storage 130 through the selector 120 by the pre-processing storage 110.

Figure 6:
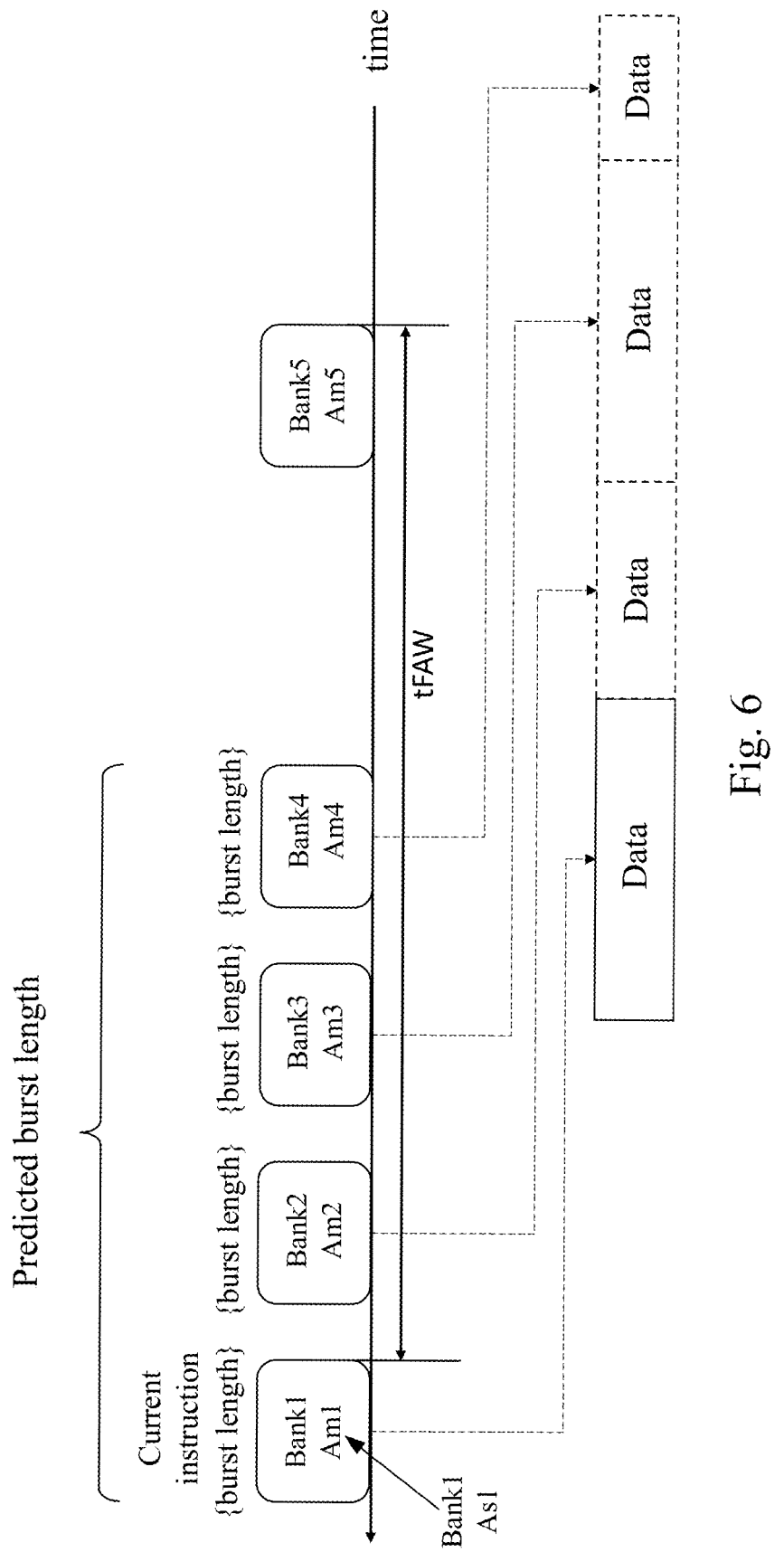
FIG. 6 shows an embodiment of an operation diagram of a memory scheduling device of the present disclosure.

As shown in FIG. 1 and FIG. 6, for example, if the predict burst length is less than the threshold burst length, instructions will delay, resulting in discontinuity in the data. At this time, the arbiter 140 transmits the selection signal Ssel to the selector 120 to select the secondary command As1 from the main command Am1 and the secondary command As1. In other words, the secondary command As1 replaces the main command Am1. Subsequently, the pre-processing storage 110 transmits the main commands Am2~Am4 of the main commands Am1~Am4 and the at least one secondary command As1 of the secondary commands As1~Asn to the current storage 130 through the selector 120. As such, the predict burst length corresponding to the main commands Am2~Am4 and the at least one secondary command As1 is no longer less than the threshold burst length, thereby avoiding instruction delay and preventing the discontinuities in the data.

In some embodiments, a current burst length corresponding to the main commands Am2~Am4 of the main commands Am1~Am4 and the at least one secondary command As1 of the secondary commands As1~Asn is larger than or equal to the threshold burst length. In other words, after the secondary command As1 replaces the main command Am1, the current burst length is larger than or equal to the threshold burst length, thereby avoiding instruction delay and preventing the discontinuities in the data.

Figure 7:
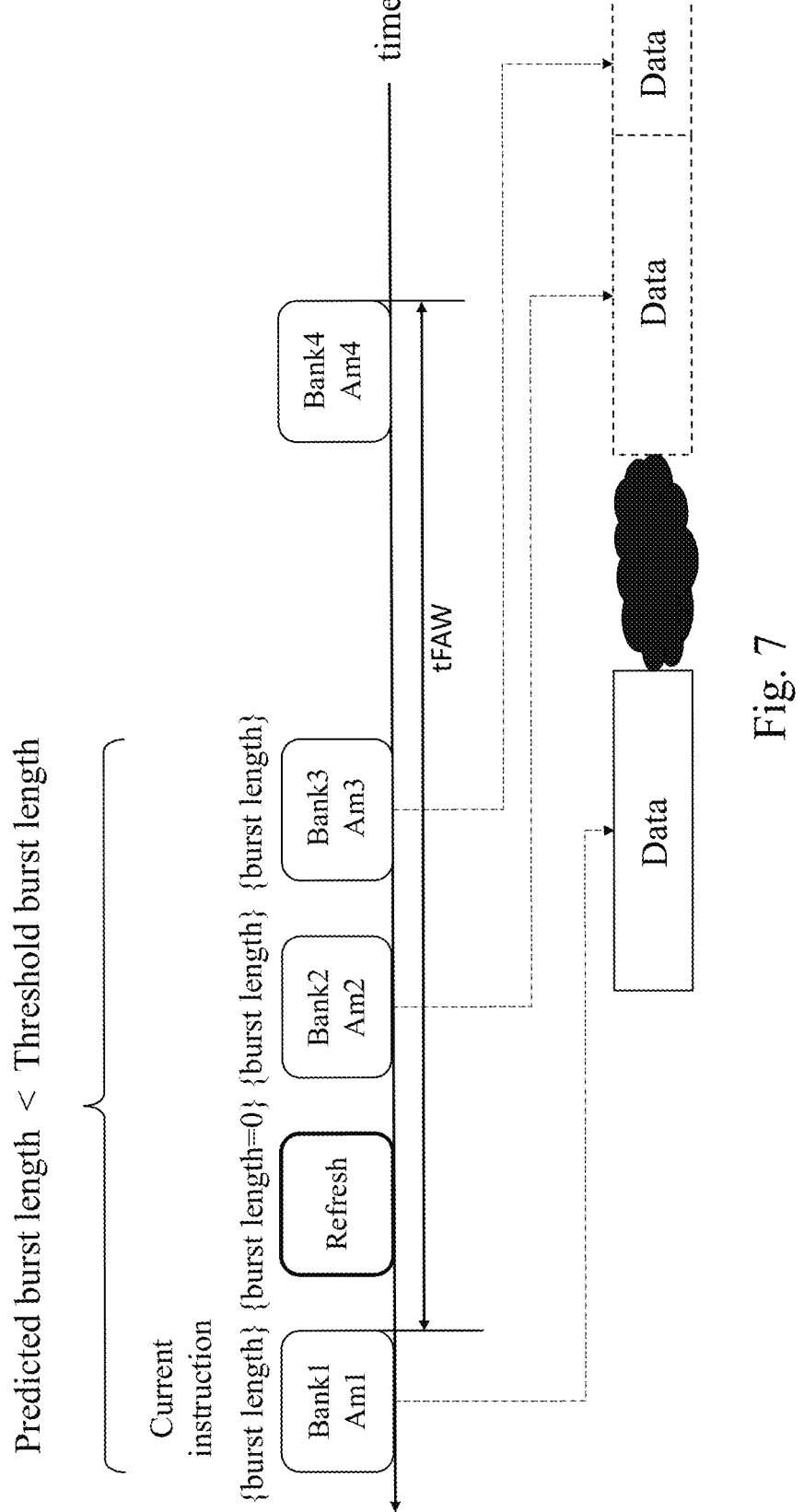
FIG. 7 shows an embodiment of an operation diagram of a memory scheduling device of the present disclosure.

Reference is now made to FIG. 7, a refresh occurs within the tFAW window. As shown in the figure, the refresh will lead to more severe discontinuities in the data. The arbiter 140 of the present disclosure can also transmit the selection signal Ssel to the selector 120 to select the secondary command As1. In other words, the secondary command As1 replaces the main command Am1, thereby avoiding instruction delay and preventing the discontinuities in the data.

Reference is now made back to FIG. 1, in some embodiments, the arbiter 140 precomputes the predict burst length corresponding to four main commands Am1~Am4 expected to be received by the current storage 130 based on the round-robin sequence and based on the four active window (tFAW) constraint. If the predict burst length corresponding to four main commands Am1~Am4 is less than the threshold burst length, the arbiter 140 transmits the selection signal Ssel to the selector 120, such that the pre-processing storage 110 transmits the main commands Am2~Am4 of the four main commands Am1~Am4 and the at least one secondary command As1 of the secondary commands As1~Asn to the current storage 130 based on the tFAW constraint through the selector 120.

In some embodiments, the pre-processing storage 110 includes a main queue pool 111 and a secondary queue pool 113. The main queue pool 111 is configured to provide the main commands Am1~Amn. The secondary queue pool 113 is configured to provide the secondary commands As1~Asn. The arbiter 140 is configured to precompute the predict burst length corresponding to the main commands (e.g., four main commands) whose number is a predetermined number in the current storage 130 transmitted from the main queue pool 111 based on the round-robin sequence.

If the predict burst length corresponding to the main commands (e.g., four main commands) whose number is a predetermined number is less than the threshold burst length, the arbiter 140 transmits the selection signal Ssel to the selector 120, such that the main queue pool 111 transmits the main commands Am2~Am4 of the main commands Am1~Am4 to the current storage 130 through the selector 120, and the secondary queue pool 113 transmits the at least one secondary command As1 of the secondary commands As1~Asn to the current storage 130 through the selector 120. A total number of the main commands Am2~Am4 of the main commands Am1~Am4 and the at least one secondary command As1 of the secondary commands As1~Asn is the predetermined number (e.g., four).

In some embodiments, the main queue pool 111 includes a plurality of main queues Bm1~Bmn, the secondary queue pool 113 includes a plurality of secondary queues Bs1~Bsn, and the selector 120 includes a plurality of multiplexers MUX1~MUXn. The at least one multiplexer MUX1 of the multiplexers MUX1~MUXn is coupled to at least one main queue Bm1 of the main queue Bm1~Bmn and at least one secondary queue Bs1 of the secondary queue Bs1~Bsn.

If the predict burst length corresponding to the main commands (e.g., four main commands) whose number is a predetermined number is less than the threshold burst length, the arbiter 140 transmits the selection signal Ssel to at least one multiplexer MUX1 of the multiplexers MUX1~MUXn of the selector 120. The at least one multiplexer MUX1 of the multiplexers MUX1~MUXn prohibits at least one main queue Bm1 of the main queue pool 111 from transmitting the main command Am1 to the current storage 130. The at least one multiplexer MUX1 of the multiplexers MUX1~MUXn allows the at least one secondary queue Bs1 of the secondary queue pools 113 to transmit the at least one secondary command As1 of the secondary commands As1~Asn to the current storage 130.

In some embodiments, each of the multiplexers MUX1~MUXn is coupled to one of the main queues Bm1~Bmn and one of the secondary queues Bs1~Bsn. For example, the multiplexer MUX1 is coupled to the main queue Bm1 and the secondary queue Bs1, the multiplexer MUX2 is coupled to the main queue Bm2 and the secondary queue Bs2, and so on.

If the predict burst length corresponding to the main commands (e.g., four main commands) whose number is the predetermined number is less than the threshold burst length, the arbiter 140 transmits the selection signal Ssel to the at least one multiplexer MUX1 of the multiplexers MUX1~MUX4 of the selector 120. The at least one multiplexer MUX1 of the multiplexers MUX1~MUX4 prohibits the at least one main queue Bm1 of the main queues Bm1~Bm4 from transmitting the main command Am1 to the current storage 130. The multiplexers MUX2~MUX4 other than the at least one multiplexer MUX1 of the multiplexers MUX1~MUX4 allows the main queues Bm2~Bm4 other than the at least one main queue Bm1 of the main queues Bm1~Bm4 to transmit the main commands Bm2~Bm4 of the main commands Bm1~Bm4 to the current storage 130. The at least one multiplexer MUX1 of the multiplexers MUX1~MUX4 allows the at least one secondary queue Bs1 of the secondary queues Bs1~Bs4 to transmit the at least one secondary command As1 of the secondary commands As1~As4 to the current storage 130.

Figure 8:
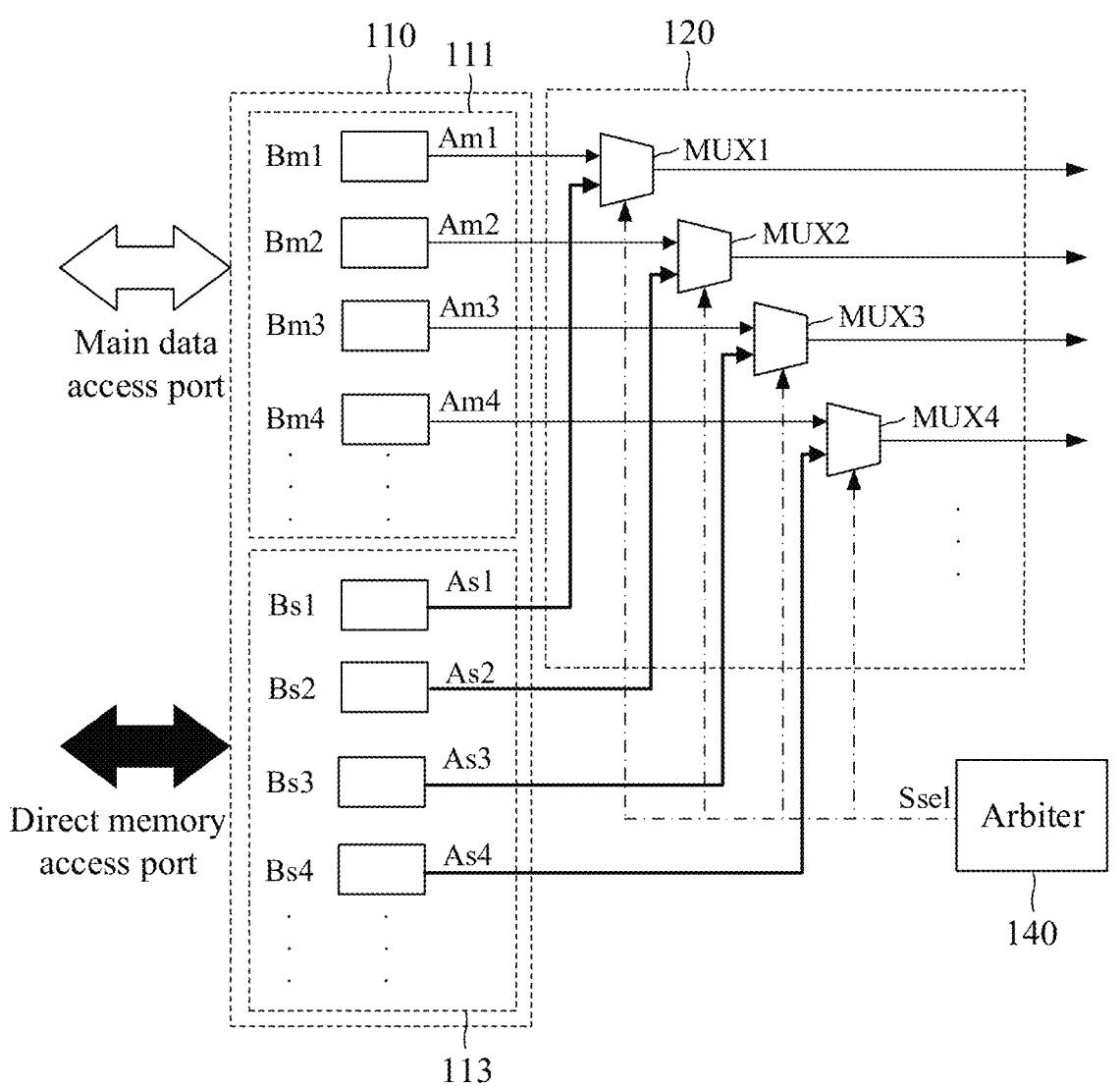
FIG. 8 shows an embodiment of a portion of structure of a memory scheduling device of the present disclosure.

FIG. 8 shows an embodiment of a portion of structure of the memory scheduling device 100 shown in FIG. 1 of the present disclosure. As shown in the figure, the main queue pool 111 includes a first main queue Bm1, a second main queue Bm2, a third main queue Bm3, and a fourth main queue Bm4. The secondary queue pool 113 includes a first secondary queue Bs1, a second secondary queue Bs2, a third secondary queue Bs3, and a fourth secondary queue Bs4. The selector 120 includes a first multiplexer MUX1, a second multiplexer MUX2, a third multiplexer MUX3, and a fourth multiplexer MUX4.

The first main queue Bm1 is configured to provide the first main command Am1 of the main commands Am1~AM4, the second main queue Bm2 is configured to provide the second main command Am2 of the main commands Am1~AM4, the third main queue Bm3 is configured to provide the third main command Am3 of the main commands Am1~AM4, and the fourth main queue Bm4 is configured to provide the fourth main command Am4 of the main commands Am1~AM4. The first secondary queue Bs1 is configured to provide the first secondary command As1 of the secondary commands As1~As4, the second secondary queue Bs2 is configured to provide the second secondary command As2 of the secondary commands As1~As4, the third secondary queue Bs3 is configured to provide the third secondary command As3 of the secondary commands As1~As4, and the fourth secondary queue Bs4 is configured to provide the fourth secondary command As4 of the secondary commands As1~As4.

The first multiplexer MUX1 is coupled to the first main queue Bm1 and the first secondary queue Bs1, and transmits the first main command Am1 or the first secondary command As1 based on the selection signal Ssel. The second multiplexer MUX2 is coupled to the second main queue Bm2 and the second secondary queue Bs2, and transmits the second main command Am2 or the second secondary command As2 based on the selection signal Ssel. The third multiplexer MUX3 is coupled to the third main queue Bm3 and the third secondary queue Bs3, and transmits the third main command Am3 or the third secondary command As3 based on the selection signal Ssel. The fourth multiplexer MUX4 is coupled to the fourth main queue Bm4 and the fourth secondary queue Bs4, and transmits the fourth main command Am4 or the fourth secondary command As4 based on the selection signal Ssel.

In some embodiments, the arbiter 140 precomputes the predict burst length corresponding to the first main command Am1 of the first main queue B1*m*, the second main command Am2 of the second main queue Bm2, the third main command Am3 of the third main queue Bm3, and the fourth main command Am4 of the fourth main queue Bm4 expected to be received by the current storage 130 based on the round-robin sequence.

If the predict burst length corresponding to the first main command Am1, the second main command Am2, the third main command Am3, and the fourth main command Am4 is less than the threshold burst length, the arbiter 140 transmits the selection signal Ssel to the first multiplexer MUX1, the second multiplexer MUX2, the third multiplexer MUX3, and the fourth multiplexer MUX4 of the selector 120, such that the first secondary queue Bs1 transmits the first secondary command As1 to the current storage 130 through the first multiplexer MUX1, the second main queue Bm2 transmits second main command Am2 to the current storage 130 through the second multiplexer MUX2, the third main queue Bm3 transmits the third main command Am3 to the current storage 130 through the third multiplexer MUX3, and the fourth main queue Bm4 transmits the fourth main command Am4 to the current storage 130 through the fourth multiplexer MUX4.

In some embodiments, a current burst length corresponding to the first secondary command As1 of the first secondary queue Bs1, the second main command Am2 of the second main queue Bm2, the third main command Am3 of the third main queue Bm3, and the fourth main command Am4 of the fourth main queue Bm4 is larger than or equal to the threshold burst length.

In some embodiments, the main queue pool 111 of the pre-processing storage 110 receives the main commands Am1~Amn through a main data access port, and the secondary queue pool 113 of the pre-processing storage 110 receives the secondary commands As1~Asn through a direct memory access port.

It is noted that the present disclosure is not limited to the embodiments as shown in FIG. 1 to FIG. 8, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

As described above, technical features of some embodiments of the present disclosure make an improvement to the prior art. The memory scheduling device and the memory scheduling method of the present disclosure can pre-determine which main commands are received by the current storage based on the round-robin sequence and calculate the predicted burst length corresponding to the above-mentioned main commands. If the predicted burst length is less than the threshold burst length, there is a possibility that the main commands may be delayed due to tFAW, causing a corresponding delay in accessing data, resulting in discontinuities in the data transmission. At this time, the present disclosure may transmit the selection signal to the selector, such that the pre-processing storage transmits the secondary commands through the selector for replacing one of the main commands which is intended to be transmitted. In view of the above, the predicted burst length corresponding to all commands (including the main and secondary commands) is larger than or equal to the threshold burst length, thereby avoiding a corresponding delay in accessing data caused by commands delay and avoiding the occurrence of discontinuities in the data transmission.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention can be flexible based on the present disclosure.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A memory scheduling device, comprising:
 a pre-processing storage, configured to provide a plurality of main commands and a plurality of secondary commands;
 a selector, coupled to the pre-processing storage, and configured to select the main commands and/or the secondary commands based on a selection signal;
 a current storage, coupled to the selector, and configured to receive the main commands and/or the secondary commands transmitted from the selector; and
 an arbiter, configured to precompute a predict burst length corresponding to the main commands expected to be received by the current storage based on a round-robin sequence, if the predict burst length corresponding to the main commands is less than a threshold burst length, the arbiter transmits the selection signal to the selector, such that the pre-processing storage transmits a portion of the main commands and at least one secondary command of the secondary commands to the current storage through the selector.

2. The memory scheduling device of claim 1, wherein a current burst length corresponding to the portion of the main commands and the at least one secondary command of the secondary commands is larger than or equal to the threshold burst length.

3. The memory scheduling device of claim 1, wherein the arbiter precomputes the predict burst length corresponding to the main commands expected to be received by the current storage based on the round-robin sequence and based on a four active window (tFAW) constraint;
 wherein if the predict burst length corresponding to the main commands is less than the threshold burst length, the arbiter transmits the selection signal to the selector, such that the pre-processing storage transmits the portion of the main commands and the at least one secondary command of the secondary commands to the current storage based on the four active window constraint through the selector.

4. The memory scheduling device of claim 1, wherein the pre-processing storage comprises:
 a main queue pool, configured to provide the main commands; and
 a secondary queue pool, configured to provide the secondary commands;
 wherein the arbiter is configured to precompute the predict burst length corresponding to the main commands whose number is a predetermined number in the current storage transmitted from the main queue pool based on the round-robin sequence;

wherein if the predict burst length corresponding to the main commands whose number is the predetermined number is less than the threshold burst length, the arbiter transmits the selection signal to the selector, such that the main queue pool transmits the portion of the main commands to the current storage through the selector, the secondary queue pool transmits the at least one secondary command of the secondary commands to the current storage through the selector, and a total number of the portion of the main commands and the at least one secondary command of the secondary commands is the predetermined number.

5. The memory scheduling device of claim 4, wherein the main queue pool comprises a plurality of main queues, the secondary queue pool comprises a plurality of secondary queues, the selector comprises a plurality of multiplexers, wherein at least one multiplexer of the multiplexers is coupled to at least one main queue of the main queues and at least one secondary queue of the secondary queues;

wherein if the predict burst length corresponding to the main commands whose number is the predetermined number is less than the threshold burst length, the arbiter transmits the selection signal to the at least one multiplexer of the multiplexers of the selector, the at least one multiplexer of the multiplexers prohibits the at least one main queue of the main queue pools from transmitting the main command to the current storage, and the at least one multiplexer of the multiplexers allows the at least one secondary queue of the secondary queue pools to transmit the at least one secondary command of the secondary commands to the current storage.

6. The memory scheduling device of claim 5, wherein each of the multiplexers is coupled to one of the main queues and one of the secondary queues;

if the predict burst length corresponding to the main commands whose number is the predetermined number is less than the threshold burst length, the arbiter transmits the selection signal to the at least one multiplexer of the multiplexers of the selector, the at least one multiplexer of the multiplexers prohibits the at least one main queue of the main queues from transmitting the main command to the current storage, a portion of the multiplexers other than the at least one multiplexer of the multiplexers allows a portion of the main queues other than the at least one main queue of the main queues to transmit the portion of the main commands to the current storage, and the at least one multiplexer of the multiplexers allows the at least one secondary queue of the secondary queues to transmit the at least one secondary command of the secondary commands to the current storage.

7. The memory scheduling device of claim 1, wherein the pre-processing storage comprises:
a main queue pool, comprising:
a first main queue, configured to provide a first main command of the main commands;
a second main queue, configured to provide a second main command of the main commands;
a third main queue, configured to provide a third main command of the main commands; and
a fourth main queue, configured to provide a fourth main command of the main commands; and
a secondary queue pool, comprising:
a first secondary queue, configured to provide a first secondary command of the secondary commands;
a second secondary queue, configured to provide a second secondary command of the secondary commands;
a third secondary queue, configured to provide a third secondary command of the secondary commands; and
a fourth secondary queue, configured to provide a fourth secondary command of the secondary commands;
wherein the selector comprises:
a first multiplexer, coupled to the first main queue and the first secondary queue, and configured to transmit the first main command or the first secondary command based on the selection signal;
a second multiplexer, coupled to the second main queue and the second secondary queue, and configured to transmit the second main command or the second secondary command based on the selection signal;
a third multiplexer, coupled to the third main queue and the third secondary queue, and configured to transmit the third main command or the third secondary command based on the selection signal; and
a fourth multiplexer, coupled to the fourth main queue and the fourth secondary queue, and configured to transmit the fourth main command or the fourth secondary command based on the selection signal.

8. The memory scheduling device of claim 7, wherein the arbiter precomputes the predict burst length corresponding to the first main command of the first main queue, the second main command of the second main queue, the third main command of the third main queue, and the fourth main command of the fourth main queue expected to be received by the current storage based on the round-robin sequence;

if the predict burst length corresponding to the first main command, the second main command, the third main command, and the fourth main command is less than the threshold burst length, the arbiter transmits the selection signal to the first multiplexer, the second multiplexer, the third multiplexer, and the fourth multiplexer of the selector, such that the first secondary queue transmits the first secondary command to the current storage through the first multiplexer, the second main queue transmits the second main command to the current storage through the second multiplexer, the third main queue transmits the third main command to the current storage through the third multiplexer, and the fourth main queue transmits the fourth main command to the current storage through the fourth multiplexer.

9. The memory scheduling device of claim 8, wherein a current burst length corresponding to the first secondary command of the first secondary queue, the second main command of the second main queue, the third main command of the third main queue, and the fourth main command of the fourth main queue is larger than or equal to the threshold burst length.

10. The memory scheduling device of claim 1, wherein the pre-processing storage receives the main commands through a main data access port, and receives the secondary commands through a direct memory access port.

11. A memory scheduling method, comprising:
precomputing a predict burst length corresponding to a plurality of main commands expected to be received by a current storage based on a round-robin sequence by an arbiter;

if the predict burst length corresponding to the main commands is less than a threshold burst length, transmitting a selection signal to a selector by the arbiter; and transmitting a portion of the main commands and at least one secondary command of a plurality of secondary commands to the current storage through the selector by a pre-processing storage.

12. The memory scheduling method of claim 11, wherein a current burst length corresponding to the portion of the main commands and the at least one secondary command of the secondary commands is larger than or equal to the threshold burst length.

13. The memory scheduling method of claim 11, wherein precomputing the predict burst length corresponding to the main commands expected to be received by the current storage based on the round-robin sequence by the arbiter comprises:

precomputing the predict burst length corresponding to the main commands expected to be received by the current storage based on the round-robin sequence and based on a four active window (tFAW) constraint by the arbiter;

wherein transmitting the portion of the main commands and the at least one secondary command of the secondary commands to the current storage through the selector by the pre-processing storage comprises:

transmitting the portion of the main commands and the at least one secondary command of the secondary commands to the current storage based on the four active window constraint through the selector by the pre-processing storage.

14. The memory scheduling method of claim 11, wherein precomputing the predict burst length corresponding to the main commands expected to be received by the current storage based on the round-robin sequence by the arbiter comprises:

precomputing the predict burst length corresponding to the main commands whose number is a predetermined number in the current storage transmitted from a main queue pool of the pre-processing storage based on the round-robin sequence by the arbiter;

wherein transmitting the portion of the main commands and the at least one secondary command of the secondary commands to the current storage through the selector by the pre-processing storage comprises:

transmitting the portion of the main commands to the current storage through the selector by the main queue pool; and transmitting the at least one secondary command of the secondary commands to the current storage through the selector by a secondary queue pool of the pre-processing storage, wherein a total number of the portion of the main commands and the at least one secondary command of the secondary commands is the predetermined number.

15. The memory scheduling method of claim 14, wherein after transmitting the selection signal to the selector by the arbiter, the memory scheduling method further comprises:

prohibiting at least one main queue of a plurality of main queues of the main queue pools from transmitting the main command to the current storage by the at least one multiplexer of the multiplexers; and allowing at least one secondary queue of a plurality of secondary queues of the secondary queue pools to transmit the at least one secondary command of the secondary commands to the current storage by the at least one multiplexer of the multiplexers.

16. The memory scheduling method of claim 15, wherein after transmitting the selection signal to the selector by the arbiter, the memory scheduling method further comprises:

prohibiting the at least one main queue of the main queues from transmitting the main command to the current storage by the at least one multiplexer of the multiplexers;

allowing a portion of the main queues other than the at least one main queue of the main queues to transmit the portion of the main commands to the current storage by a portion of the multiplexers other than the at least one multiplexer of the multiplexers; and allowing the at least one secondary queue of the secondary queues to transmit the at least one secondary command of the secondary commands to the current storage by the at least one multiplexer of the multiplexers.

17. The memory scheduling method of claim 11, wherein precomputing the predict burst length corresponding to the main commands expected to be received by the current storage based on the round-robin sequence by the arbiter comprises:

precomputing the predict burst length corresponding to a first main command of a first main queue of a main queue pool of the pre-processing storage, a second main command of a second main queue of the main queue pool of the pre-processing storage, a third main command of a third main queue of the main queue pool of the pre-processing storage, and a fourth main command of a fourth main queue of the main queue pool of the pre-processing storage expected to be received by the current storage based on the round-robin sequence by the arbiter.

18. The memory scheduling method of claim 17, wherein if the predict burst length corresponding to the main commands is less than the threshold burst length, transmitting the selection signal to the selector by the arbiter comprises:

if the predict burst length corresponding to the first main command, the second main command, the third main command, and the fourth main command is less than the threshold burst length, transmitting the selection signal to a first multiplexer, a second multiplexer, a third multiplexer, and a fourth multiplexer of the selector by the arbiter, such that a secondary queue of a secondary queue pool of the pre-processing storage transmits a first secondary command to the current storage through the first multiplexer, the second main queue transmits the second main command to the current storage through the second multiplexer, the third main queue transmits the third main command to the current storage through the third multiplexer, and the fourth main queue transmits the fourth main command to the current storage through the fourth multiplexer.

19. The memory scheduling method of claim 18, wherein a current burst length corresponding to the first secondary command of the first secondary queue, the second main command of the second main queue, the third main command of the third main queue, and the fourth main command of the fourth main queue is larger than or equal to the threshold burst length.

20. The memory scheduling method of claim 11, further comprising:

receiving the main commands through a main data access port, and receiving the secondary commands through a direct memory access port by the pre-processing storage.

\* \* \* \* \*